June 5, 1956          M. RUDERFER          2,749,480
APPARATUS FOR PRODUCING THREE-DIMENSIONAL VISUAL PATTERNS
Filed Nov. 24, 1952          5 Sheets-Sheet 1
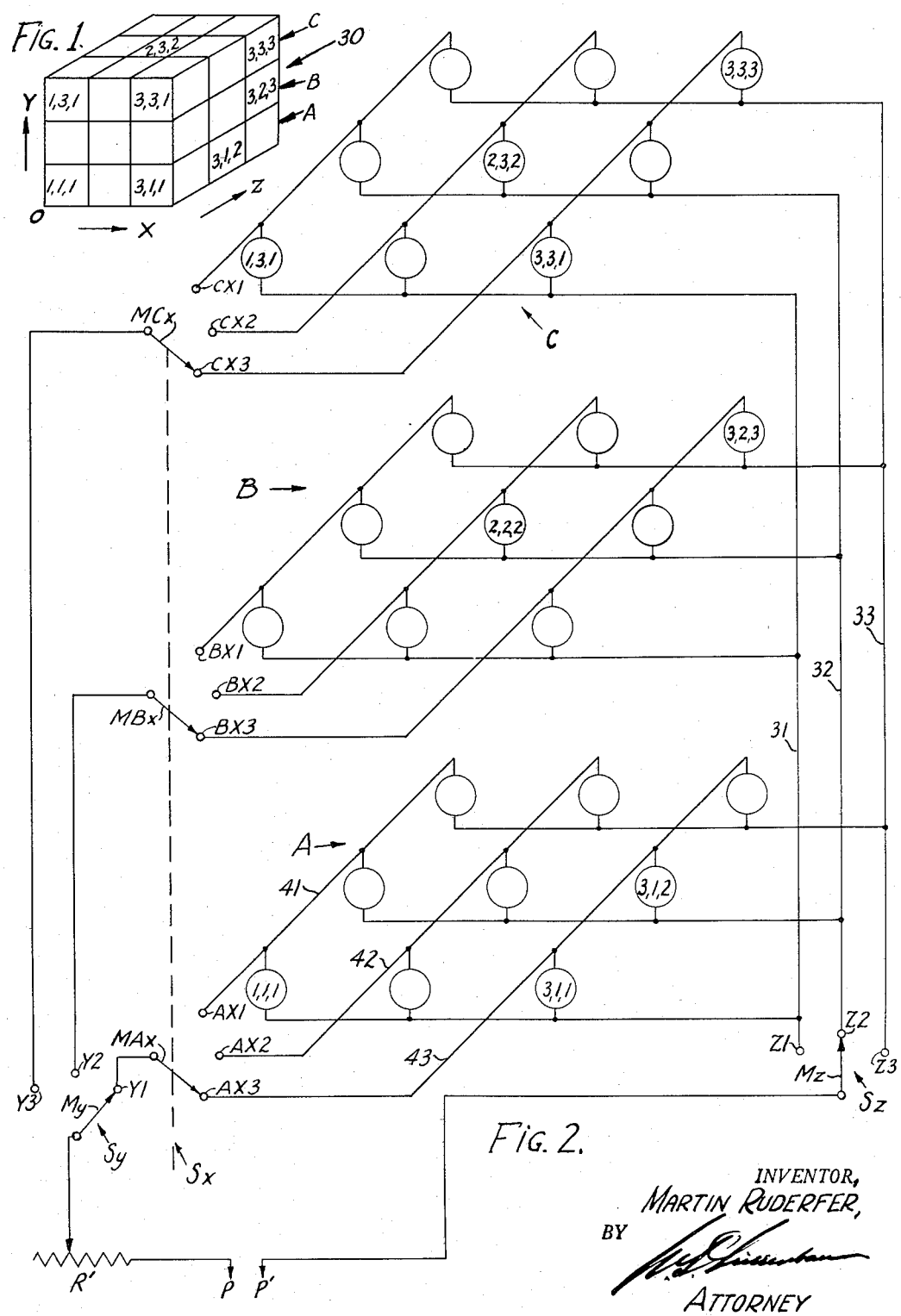
INVENTOR,
MARTIN RUDERFER,
BY
ATTORNEY June 5, 1956 — M. RUDERFER — 2,749,480
APPARATUS FOR PRODUCING THREE-DIMENSIONAL VISUAL PATTERNS
Filed Nov. 24, 1952 — 5 Sheets-Sheet 2

INVENTOR,
MARTIN RUDERFER,
BY
ATTORNEY

June 5, 1956 — M. RUDERFER — 2,749,480
APPARATUS FOR PRODUCING THREE-DIMENSIONAL VISUAL PATTERNS
Filed Nov. 24, 1952 — 5 Sheets-Sheet 3
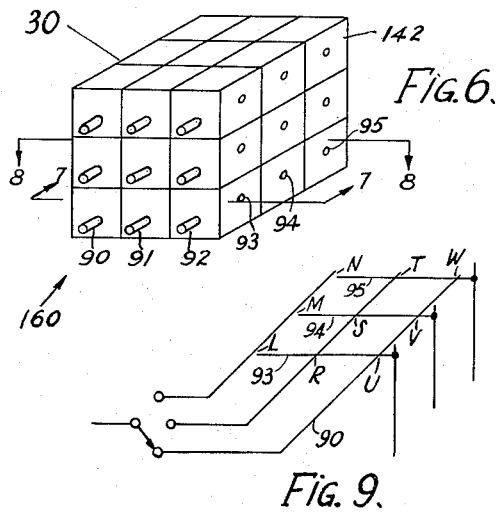
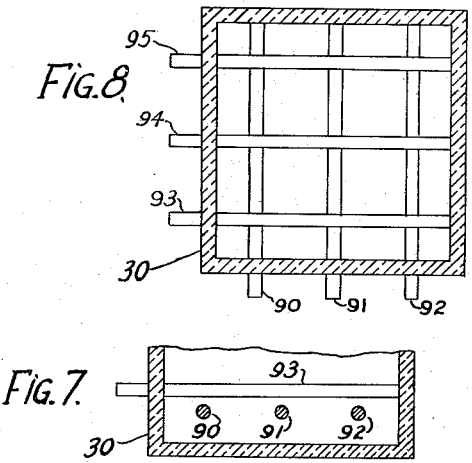
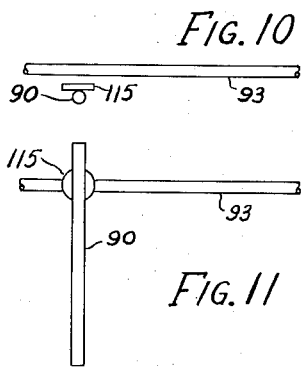
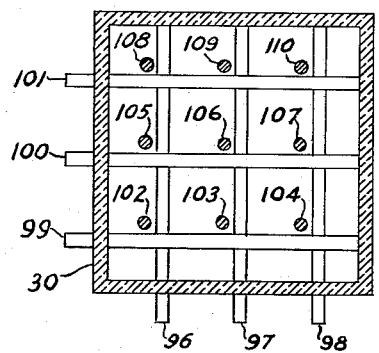
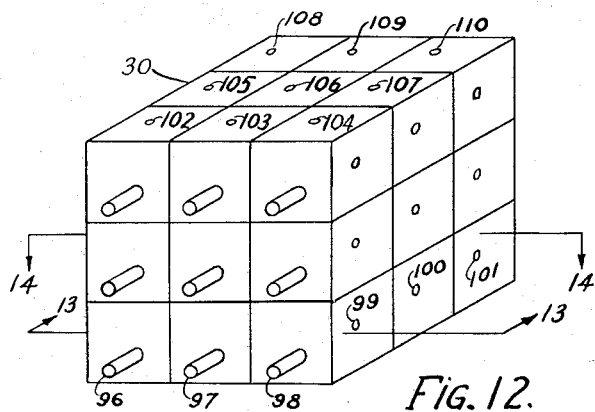
INVENTOR,
MARTIN RUDERFER,
BY
ATTORNEY.

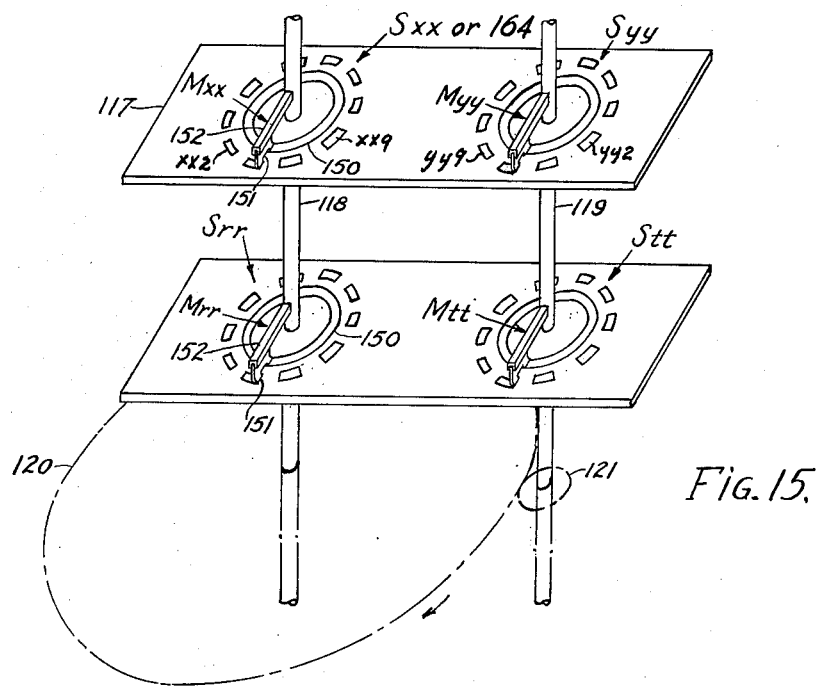
Fig. 15.
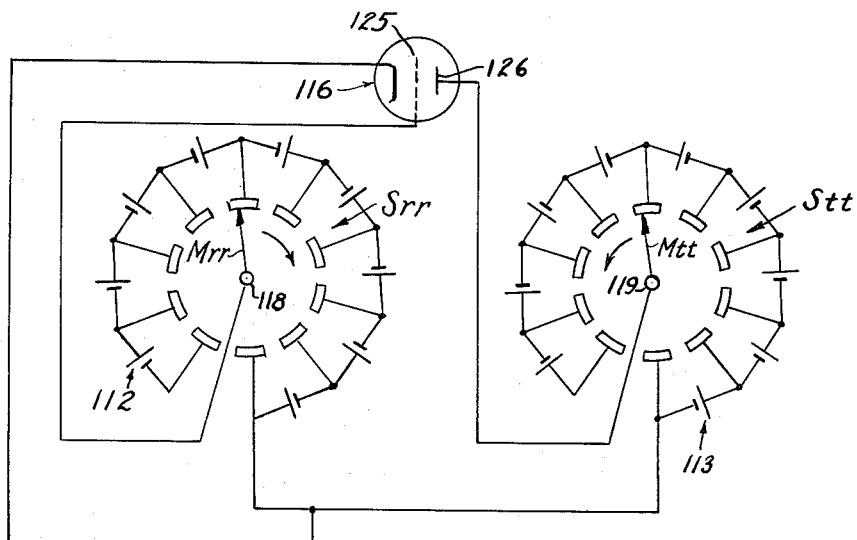
Fig. 16.
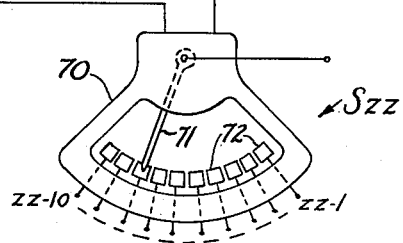
INVENTOR,
MARTIN RUDERFER,
BY
ATTORNEY June 5, 1956 M. RUDERFER 2,749,480
APPARATUS FOR PRODUCING THREE-DIMENSIONAL VISUAL PATTERNS
Filed Nov. 24, 1952 5 Sheets-Sheet 5
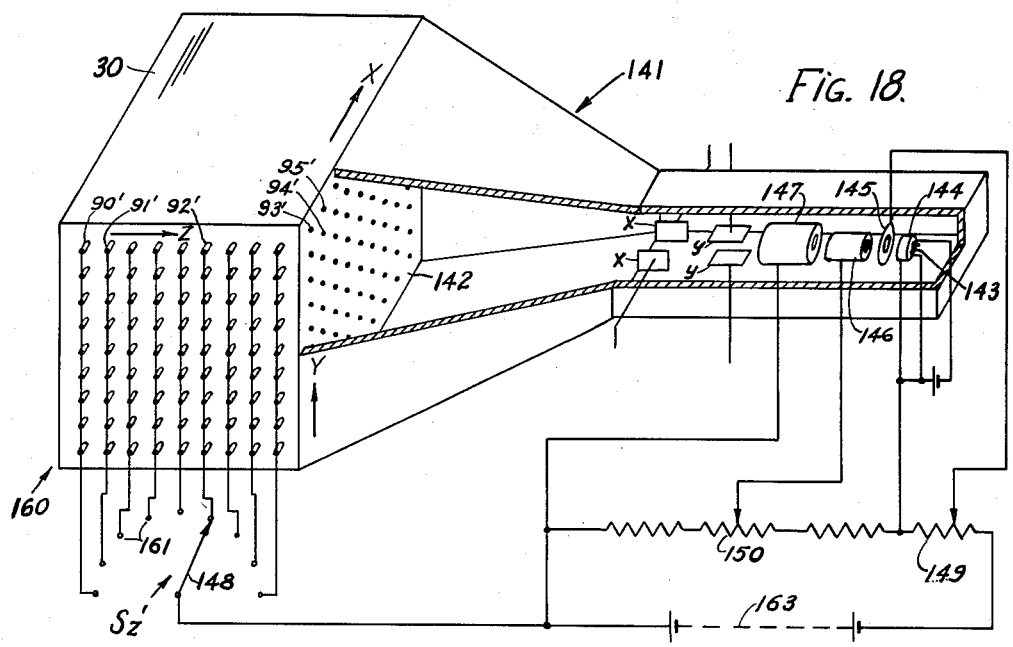
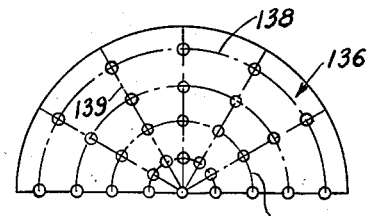
Fig. 19.
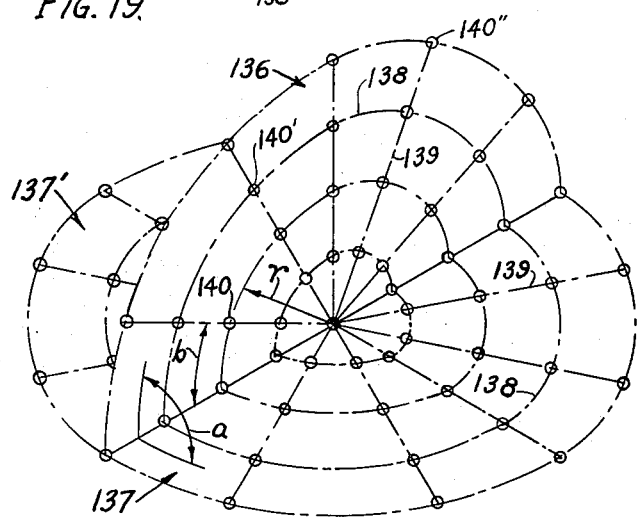
Fig. 20.
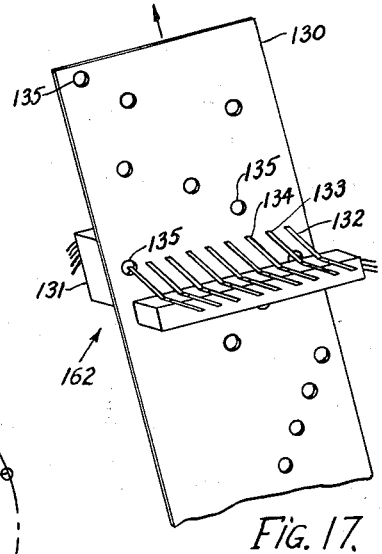
Fig. 17.
INVENTOR,
MARTIN RUDERFER,
BY
ATTORNEY

United States Patent Office 2,749,480
Patented June 5, 1956

2,749,480
APPARATUS FOR PRODUCING THREE-DIMENSIONAL VISUAL PATTERNS

Martin Ruderfer, Kew Garden Hills, Flushing, N. Y.

Application November 24, 1952, Serial No. 322,326

18 Claims. (Cl. 315—169)

The principal object of this invention is to provide a novel and improved apparatus to produce visual representations in three dimensions of the characteristics of three variables which are incident in the operation of various electrical and mechanical devices and systems.

Another object is to provide a novel and improved device to produce visual representations in three dimensions of the characteristics of three variable quantities of the nature mentioned, which may be incident of the same or different systems and which originally may be of incidents of operation acted at different times, yet with this apparatus is presented as acting simultaneously.

A further object hereof is to provide a novel and improved apparatus which is similar in application to a cathode ray tube, but with the addition of a third dimension to enable the observation of patterns in three dimensions.

Other objects and advantages will become apparent as this disclosure proceeds.

Essentially my new apparatus includes a plurality of illuminable points or zones determining for instance a cubical or spherical volume. These "light-points" stud such volume and are arranged in geometric fashion with respect to three dimensional mathematical coordinates. Such "light-points" are afforded by electrically-operated lamp means of various types as will be hereinafter explained. Such lamp means may need either two or three electrical connections each to be in circuit. Switch means are provided to selectively choose the light-point to be actuated. As will be seen, the switching means is materially simplified when the lamps are of the three-connection type.

In the accompanying drawings forming part of this specification, similar characters of reference indicate corresponding parts in all the views.

Fig. 1 shows a cubical volume in perspective, marked with the usual mathematical coordinate axes X, Y, Z. Each side of the cube shown is divided in three, thus dividing the cube into what may be termed twenty-seven zones, each of which may be identified with respect to said coordinate axes by a coordinate designation usually given a point in space with respect to the origin "O." In each of said zones, a lamp is positioned and each such lamp may be deemed a light-point as referred to herein. This diagrammatic presentation will aid in explaining Fig. 2

Fig. 2 shows electric lamps deemed positioned one in each of the zones indicated in Fig. 1, and sets forth the diagram of the electrical circuit including such lamps and the switching mechanisms for selectively actuating same, in accordance with the teachings of this invention. The lamps here shown are of the type having two connections each to be in the circuit and are for instance incandescent or neon lamps.

Fig. 6 is a perspective view showing a transparent cubical envelope marked for purposes of explanation with the zones indicated in Fig. 1. This envelope has wires mounted therein in the fashion shown and is filled with air, neon, or other suitable gas. Regions where the wires cross afford "light-points" within the envelope.

Fig. 7 is a fragmentary section taken at lines 7—7 in Fig. 6.

Fig. 8 shows the arrangement of one set of intersectingly positioned wires and is a section taken at lines 8—8 in Fig. 6.

Fig. 9 relates the electrical connections of one such set of wires offering light-points, as a component of the wiring diagram set forth in Fig. 2. It is to be noted that the light-points shown may be deemed on the two-connection type as will be explained.

Fig. 10 shows one set of such wires of a slightly modified construction.

Fig. 11 is a bottom view of Fig. 10.

Figs. 12, 13 and 14 are respectively akin to the views shown in Figs. 6, 7 and 8, but concern light-points afforded by three connections to the circuit.

Figure 4:
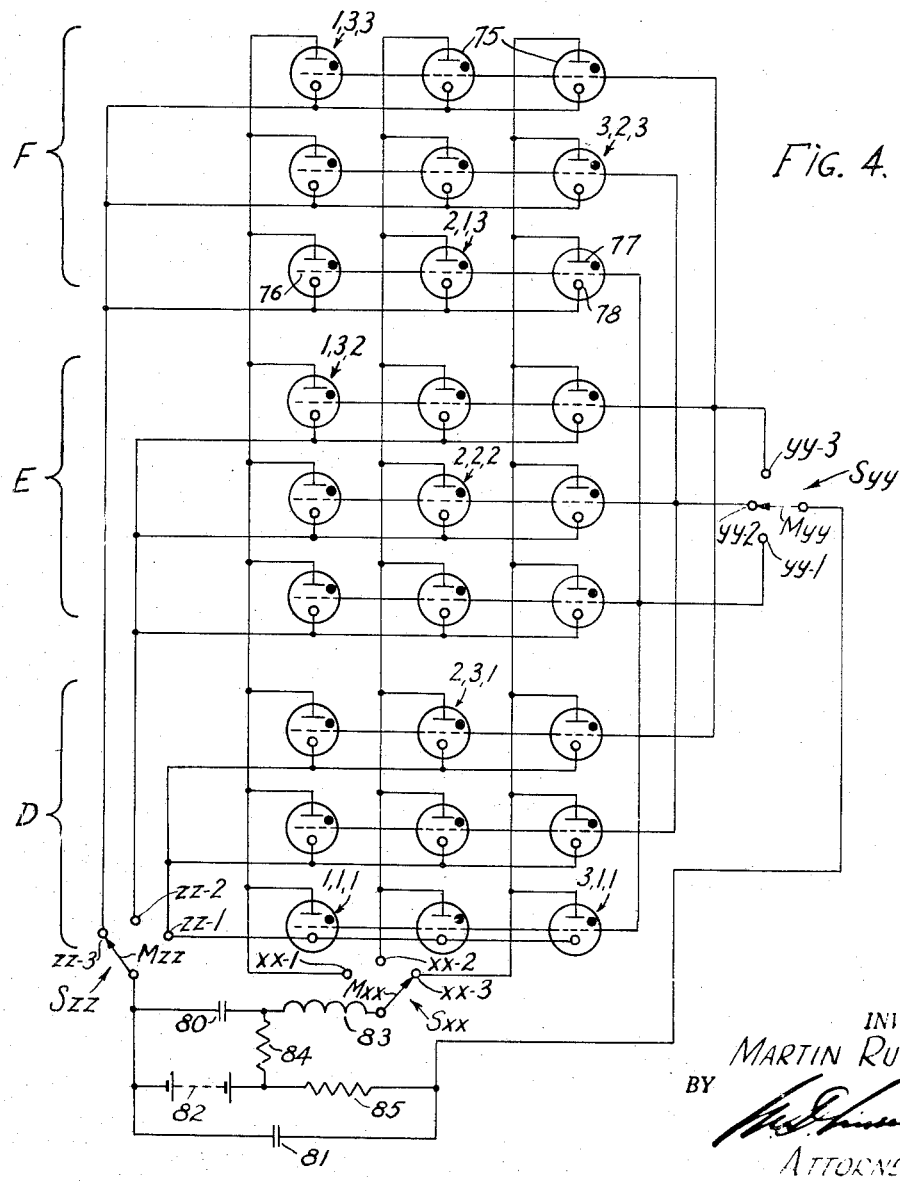
Fig. 4 is a wiring diagram of a system akin to that shown in Fig. 2, but having lamps of the type requiring three connections each to be in circuit. Here, the switch means required is materially simpler than that shown in Fig. 2

It might here be noted that each coordinate of the light-point devices deemed an assembly as in Figs. 2 and 4, is representative of one of the mentioned variable quanties, and that there are three such switch means whose setting at any time determine the coordinates of the light-point to be actuated. A switch means may be afforded by a meter movement arranged to measure one of the variables; the moving pointer of such meter serving as the contact arm of one of the electrical switches of the system and operates on a fixed commutator in place of the usual scale. In other instances, switches of the system may be operated to change the value of the ordinates they control, by moving their switch arms by some external means in predetermined timed relation and direction of movement, depending upon the circumstances. Directed electron beams may also serve as switches as will be explained.

Fig. 15 shows two of the switches of the system of Fig. 4 and some associated mechanism, and Fig. 16 shows the diagram of electrical connections including such associated mechanism used with the apparatus of Fig. 4, for obtaining the visual representation of three variables determining the characteristics of a triode. The third switch of the system of Fig. 4 is shown in Fig. 16, as shown afforded by a meter means.

Fig. 17 shows a perforated tape associated with a modified form of one of the switch means of the system herein set forth, to illustrate another manner of using the apparatus taught herein.

Fig. 18 is a diagrammatic view including the electrical circuit for a light-point apparatus in which switching two of the coordinates of the point to be illuminated is determined by the positioning of an electronic beam, while the third ordinate determining a point, is determined by a switching means as shown previously herein.

Although the viewing space comprised of light-points has been shown in the form of a cube, other special forms may be used. The sphere is also a very practical form.

Fig. 19 shows one of the planes in which the light-points are situated in a hemisphere.

Fig. 20 shows two intersecting planes of said hemisphere showing the positions of the light points and indicating how the coordinates of such points are defined.

In the drawings, the cubical form shown in Fig. 1, is a transparent frame which may be an envelope 30, marked with division lines to facilitate explanation. It is shown divided in three stories, each of which is divided into nine cubical zones. In each of these zones is positioned an electric lamp of the type requiring two connections to be made in a circuit. Such lamps are incandescent filament bulbs or neon bulbs, for example.

To identify these zones, I have resorted to a marking system used in mathematics where point "O" is deemed the origin, and have indicated the "X" axis along the width of the cube, the "Y" axis along the height, and the "Z" axis along the depth thereof. Any zone of the cube 30 can thus be identified by its coordinates with respect to the origin "O." Some of the zones are marked with their respective coordinates, and it is to be noted that the lamps in the circuit diagram shown in Fig. 2, are designated by the coordinates of the zones they reside in respectively, to avoid undue multiplicity of numerical notation. All lamps constituting the lamp bank "A," are positioned in the first story of the cubical envelope 30, where the value of the "Y" ordinate equals one. All lamps included in the lamp bank "B," are located in the second story where the "Y" ordinate equals two. All lamps comprising the lamp bank "C," are in the third story where the "Y" ordinate equals three. The coordinates of each lamp and its zone are designated by a group of three numerals, which in succession are the "X," "Y" and "Z" values of such zone and its lamp.

Referring to the schematic wiring diagram shown in Fig. 2, all lamps whose "Z" ordinate is one, have one of their respective terminals electrically connected to a conductor 31 which terminates in a switch contact point designated as Z1. All lamps whose "Z" ordinate is two, have one of their respective terminals electrically connected to a conductor 32 which terminates in a switch contact point Z2. All lamps whose "Z" ordinate is three, have one of their respective terminals electrically connected to a conductor 33 which terminates in a switch contact element Z3. The notation Sz denotes the Z-ordinate switch which includes a movable contact arm Mz which may be moved into contact with said switch points Z1, Z2, Z3 respectively. It is evident that one terminal of each lamp is already connected in the circuit shown, to a conductor of the Z series. The other terminal of each of the lamps is connected to a conductor of the X series, as follows: each lamp in bank "A" whose "X" ordinate is one, has its remaining terminal electrically connected to a conductor 41 which terminates in a switch element AX1. Each lamp in bank "A" whose "X" ordinate is two, has its remaining terminal electrically connected to a conductor 42 which terminates in a switch contact point AX2. Each lamp in the bank "A" whose "X" ordinate is three, has its remaining terminal electrically connected to a conductor 43 which terminates in a switch contact point AX3. Similar X series connections are incident for each of the lamp banks "B" and "C" independently, thereby affording the group of switch contact points BX1, BX2, BX3, and the group CX1, CX2, CX3. Each X group of contact points has its own contact arm. These contact arms MAx, MBx, MCx, are mechanically connected to move in synchronism so that each is similarly positioned with respect to the respectively associated switch point groups.

The notation Sx denotes the X-ordinate switch means whose arms MAx, MBx, MCx are respectively electrically connected to the switch contact points Y1, Y2, Y3 of the Y-ordinate switch Sy whose movable arm is "My." The terminals P, P' of a source of electrical energy suitable for the operation of a light-point, are connected respectively to the switch arm "My" and "Mz" with a variable resistance R' interposed in one of such connections, for the adjustment of the intensity of illumination from the light-points.

In the system set forth in Fig. 2, only one lamp will be lit at any one time, and which one will depend on which respective switch contact points will be contacted by the switch arms My, Mz and one of the arms of the Mx series of the switch means Sx. In the particular condition shown in Fig. 2, the lamp in the zone position 3—1—2, meaning the zone whose coordinates have the values X equals 3, Y equals 1, Z equals 2, will be operated. It is evident that the coordinates of an illuminated zone will be determined by the three switch means Sx, Sy, Sz, and that only the lamp in this zone selected will be illuminated at any one time.

Any of these switch means may be in the form of a meter designed to measure one of the variables whose characteristic, the device of Fig. 1 and Fig. 2, will be called upon to portray. Such meter may be as for example, a voltmeter, a milliammeter 70 as in Fig. 16, a Bourdon gauge or other meter device having a moving pointer 71. Switch contact points are provided in the path of such pointer as shown at 72. Said pointer is made to serve as the moving arm of say the switch means Sz, while the switch points 72 are to serve for Z1, Z2, etc., ad Zn.

It is to be noted that although the device illustrated shows a transparent cubical frame 30 divided into twenty-seven illuminable zones, it is intended and for all practical purposes necessary that the number of zones be much greater in number, be as small as possible and therefore use lamps which occupy as small a space as possible. The connecting wires shall be thin so as not to mar visibility to an appreciable degree, and yet be strong enough to support the lamps. Such wires may be engaged through the walls of the frame and extend outward therefrom for connection to the switch means. Regardless of the number of zones chosen, say for instance "$n$" zones per co-ordinate, the wiring scheme would follow that shown in Fig. 2, except that there would be "$n$" switch contact points in switch means Sz, in switch means Sy and in each of the related units "$n$" in number, in the switch means Sx. There would be "$n$" stories of lamps in the frame 30, and each story would contain a bank of $n^2$ lamps. Mathematically speaking, the coordinates X, Y, Z, would have values from one to "$n$."

To avoid a multiplicity of switch units as comprise the switching means Sx in the apparatus shown in Fig. 2, and to provide that the switching means for Sx shall be as simple as shown for either Sy or Sz, I use lamps of the type requiring three connections each to be in circuit, thus affording the arrangement whose wiring diagram is shown in Fig. 4. However, a single three terminal lamp 75, and one method of operating it will be explained before a detailed description is given of the system of Fig. 4.

Figure 3:
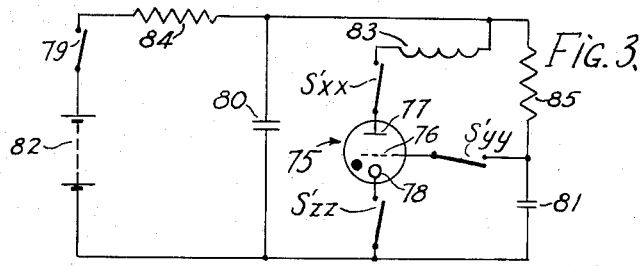
Fig. 3 is a wiring diagram of a circuit for actuating an electrically operated lamp having three connections to be included in such circuit.

Lamp 75 may be of the type having a grid 76 as the third element to control the start of the light-producing discharge between the other two electrodes 77 and 78 of said lamp. A typical circuit with such three element lamp is shown in Fig. 3. When switch 79 is closed, the capacitors 80 and 81 charge up to the voltage of the battery 82. Since the grid 76 is at a positive voltage, capacitor 80 will be permitted to discharge through the inductance 83 and the tube or lamp 75, producing light between the electrodes 77 and 78 for the duration of such discharge. When the voltage across the capacitor 80 has diminished to a value less than the extinction voltage of the lamp, the discharge stops and capacitor 80 charges up again through the resistor 84. The inductance 83 is used to control the duration of discharge since it controls the rate at which the capacitor 80 discharges its energy. The capacitor 81 also charges up after the discharge aforesaid stops, but resistor 85 is chosen so that capacitor 81 does not charge up as rapidly as capacitor 80. Thus, when the grid 76 again attains a sufficient positive voltage to permit the discharge between the electrodes 77 and 78 to start again due to the charging of the capacitor 81, the capacitor 80 is already fully charged and ready to repeat the cycle. This cycle of operation will be repeated continuously, producing pulses of light at a rate determined by the time constant of the capacitor 81 and the resistor 85. This time constant is chosen so that the pulses of light are very rapid, say over a thousand times per second, so that the light appears continuous to the eye. The circuit may be made inoperable upon opening of the switch 79, or any of the three control switches S'xx or S'yy and S'zz. The circuit of Fig. 3, is one of many known in the art, which is suitable for use with the three element lamps.

Figure 5:
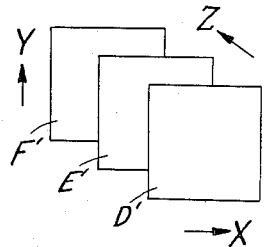
Fig. 5 shows the planes of each of the lamp groups of Fig. 4.

In the system shown in Fig. 4, deemed within a transparent cubical frame akin to 30, three banks of lamps 75 are employed, each bank having nine lamps. The lamp banks are denoted respectively by the letters "D," "E" and "F," each of which is in a vertical plane, and one is behind the other as depicted in Fig. 5 by the planes denoted respectively as D', E' and F'. As previously, the value of "n" here is three. Of course, "n" may be any number and the wiring scheme would be the same. All grids 76 of all lamps having the Y-ordinate of the value one, are connected together electrically to the switch point yy–1, those having the Y-ordinate of the value two, are electrically connected to the switch point yy–2 and those having the Y-ordinate of the value three are electrically connected to the switch point yy–3. These switch points of the yy-series and their associated movable contact arm Myy constitute the switch means denoted as Syy. All corresponding electrodes 77 are electrically connected in similar fashion to the respective switch points xx–1, xx–2, xx–3 of the X-ordinate switch means Sxx whose movable contact arm is Mxx. All corresponding electrodes 78 are electrically connected also in such manner and similar fashion, to the respective switch points zz–1, zz–2, zz–3 of the z-ordinate switch means Szz whose movable contact arm is indicated as Mzz. Since the position of the switch arms Mxx, Myy and Mzz determine only one lamp of Fig. 4 which can be operated at any one time, such movable switch arms may be deemed the terminals of a single lamp, and hence are associated with the balance of the elementary circuit components and connections as are the terminals of the single lamp 75 in the system shown in Fig. 3.

Instead of using lamps in individual frames as described, which would cause distortion of the light from lamps furthest from the observer when there are many lamps, I further simplify the device by eliminating the individual envelopes around each lamp. Where the light-points are incandescent lamps, the frame 30 is constructed as a gas-tight transparent envelope, either evacuated or containing nitrogen or other inert gas used in incandescent lamps. The individual filaments corresponding to each light point, are hung on the appropriate lead wires. Where the light-points are afforded by electric discharge lamps, but without their individual envelopes, the frame akin to 30 may be left open to the atmosphere, whence the discharge will occur in air. Since this entails use of high voltages, it is sometimes an advantage to construct the frame as a transparent envelope filled with neon, krypton, xenon, or other gas used in electric discharge lamps.

When the individual lamp envelopes are eliminated, there is a further advantage in that the individual lamp bases may be also eliminated, and the lamp elements mounted directly on the connecting wires. This also materially improves visibility throughout the viewing space, especially when there are a large number of light-points. For the case of the electrical discharge lamps, the simplest arrangement is obtained when the lamp elements are also eliminated such that the connecting wires shall serve also as the lamp elements. The equivalent of the two-connection electrical discharge lamp is, in this way, effected by a pair of spaced intersectingly positioned wires If a suitable voltage is applied across such two wires, a light-producing electrical discharge will occur in the region where the wires are closest. Hence, these sections of the wires, correspond to the elements of a two-connection discharge lamp.

In Fig. 9, is shown two sets of crossing wires affording light-points at for instance the regions L, M, N, R, S, T, U, V, W, where such wires are closest. If a suitable voltage is applied between the wires 90 and 93, a light-producing electrical discharge will occur at region U. If the connection of such voltage source is switched from wire 93 to the wire 94, the discharge will occur at region V, and so on.

Utilizing this teaching, to provide a system of light-points akin the condition afforded in Figs. 1 and 2, the conductors are arranged as shown in Figs. 6, 7 and 8. The conductors shown in one story of the envelope 30, are designated by the numerals 90, 91, 92, and those marked 93, 94 and 95. The circuit for such structure is the same as shown in Fig. 2. To provide the light-points akin to the condition afforded in Fig. 4, three spaced conductors are at each light-point position as shown in Figs. 12, 13 and 14. The conductors shown in one story of an envelope akin to 30, are desigated by the numerals 96 to 110 respectively. The circuit for such structure is the same as shown in Fig. 4. The material and physical srructure of all such conductors in Figs. 6 and 12, may be akin to the respective components of the lamps they are substitute for. Of course, whenever said conductors cross, greater adjacent surface areas may be presented where desired, as in the original discharge lamps, by having a conductive disc or tab 115 on one or more of such wires; one such element 115 on one of the wires being shown in Figs. 10 and 11.

Any of the systems of apparatus set forth, can be used for example to produce a three-dimensional visual representation of the characteristics of a triode 116. In a triode, the plate voltage-plate current characteristic depends upon the grid voltage. Since we are dealing in such instance with three variables, a plane is not sufficient to portray complete triode characteristic. It has been the practice to portray a family of curves in one plane showing plate voltage-plate current relationship with respect to different values of grid voltage. With the apparatus of the nature described, using either of the circuits and arrangements explained, such family of curves is produced in visual form successively for different values of grid voltage and the family repeated rapidly, thereby offering a true three-dimensional visual representation of the characteristic of a triode, where grid voltage, plate voltage and plate current are portrayed respectively along the X, Y and Z axes. Such a presentation, which is a surface in three dimensions, contains more information, is clearer and is more instructive than the conventional two-dimensional presentation and is therefore more useful in the testing, application and development of tubes.

Making use of the system shown in Fig. 4, the switches Sxx and Syy are built as shown in Fig. 15, where "n" is ten. The switch points of the xx-series are mounted equi-spaced in a circle on a fixed dielectric member 117. The switch points of the yy-series are mounted equi-spaced in a circle on the same dielectric member 117. Each arm akin to Mxx is a conductive brush in the path of the switch points and in sliding contact on a metal ring 150 for connection in the circuit; said brush 151 being carried on an insulated arm 152 extending radially from the shaft it is on. One of the shafts hereafter identified, is driven by a motor which is not shown.

The shafts 118 and 119, each carries a second switch structure identical with Sxx and Syy respectively. These are designated as Srr and Stt, whose switch arms are Mrr and Mtt respectively. There are ten switch points in each. The switch arms on each shaft are coplanar and the sets of switch points on each shaft are respectively in alignment. The gears 120 and 121 are in the ratio of "n" to one, where "n" in this case is ten; the latter being the smaller. The switch arms Mrr and Mtt are connected to the grid 125 and the plate 126 respectively of the triode 116 under test. Batteries are connected in series in two sets 112, 113. The terminals of equal potentials of these sets are connected to the switch contact points of the switches S*rr* and S*tt* as shown, so that the grid 125 becomes increasingly positive in equal steps and the plate 126 becomes increasingly positive as the respective switch arms travel upon shaft rotation. It is evident that the grid 125 will be subjected to successive increased positive voltages for each revolution of the shaft 118, while the plate 126 will be subjected to successive increased positive voltages for each position of switch S*rr*, hence for each grid voltage.

The plate current may be measured by means of a high speed meter switch as shown, where pointer 71 is akin to M*zz* in Fig. 4 and the switch points 72 are of the series *zz*–1 to *zz*–10. The position of the switch arm pointer 71 is determined by the magnitude of the plate current. While the switch arms M*rr* and M*xx* are at one position, the plate 126 is being subjected to successive increased positive voltages, and the plate current increases in a manner peculiar to the tube under test. Then the switch arms M*rr* and M*xx* move to the next contact point of their respective switch structures, and the plate 126 is again supplied with increasing voltages. Thus the plate voltage-plate current characteristic is portrayed in all the X planes. If this is repeated more than approximately sixteen times a second, the motor rotating accordingly, the characteristic of the triode 116 will appear visually in a three-dimensional format, due to the persistence of vision.

For similar accomplishment, but using the system shown in Fig. 2, there would be "*n*" switches in addition to S*rr* on shaft 118. Where "*n*" is ten, there would be ten switches identical to S*xx* of Fig. 15 on shaft 118 in addition to S*rr*, which group of ten switches would comprise switch S*x* of Fig. 2 for a system where "*n*" equals ten.

Instead of the continuously rotating switches shown in Fig. 15, values of any of the variables with respect to time may be set forth as punched holes in a tape 130. The switch structures S*xx*, S*yy* and S*zz* in the system of Fig. 4, may then take the form shown in Fig. 17, where the fixed metal plate 131 is akin to a switch arm, and the metal brushes for instance as 132, 133 and 134, take the place and function of the switch points. Each of said brushes is of course insulated from each other and touch the plate 131 when a perforation 135 in the tape permits. In this embodiment of switch structure, the tape 130 is the travelling member. These tapes are prepared in accordance with the performance of a variable physical, time or electrical quantity operating in the same or different systems and the same or different times.

The space affording the illuminable points, may be other than cubical. For instance, the frame akin to 30 when hemispherical, may have the light points 140, 140', 140" arranged so that the coordinates of any point in the sphere may be designated in an orderly system. The hemispherical space may be deemed divided into semi-circular sectors only one plane in each of which is shown as 136, 137 and 137' respectively, and in each, the light-points are arranged in concentric semi-circles as 138 along radial lines as 139, shown in Figs. 19 and 20. The coordinates of any particular light-point as for instance of 140, can be given as determined by the angles "*a*" and "*b*" and the radius "*r*" where the plane of the base of the hemisphere serves for the commencement of count. The associated switches S*x*, S*y* and S*z*, or S*xx*, S*yy* and S*zz* are then arranged to switch in the "directions" "*a*," "*b*" and "*r*" to conform to this chosen coordinate system for the sphere, instead of the coordinate system of X, Y, Z of Fig. 1.

So far, the switching means have been shown as mechanical switches with moving contact arms, but it has been mentioned that any suitable switching means may be used. It will be recognized by those versed in the art, that the switch arm, such as M*xx*, may be, for instance, an electron beam which is directed by electrical or magnetic means to strike any of the switch contacts, thereby affording a high speed switch action. I have shown such a switching means in combination with the embodiment of Fig. 6 in Fig. 18. The tube 141 is akin to a cathode ray tube except that one wall 142 of envelope 30 of 160 is substituted for the usual fluorescent screen. The tube contains the usual heater 143, cathode 144, grid 145, a first anode 146 and a second anode 147, which when supplied with the appropriate voltages in the customary fashion as shown in Fig. 18, produces a beam of electrons which travel along the central axis of the tube and strike the wall 142. Two pairs of deflection plates, *x—x* and *y—y*, which are located between the wall 142 and the second anode 147, serve to deflect the electron beam in the X and Y directions respectively when suitable voltages are applied thereto. The deflection plates may therefore be deemed the equivalent of switching mechanisms S*x* and S*y*, or S*xx* and S*yy*. By applying the proper voltages to each pair of deflection plates, the electron beam may be "switched" to strike the exposed ends of any one of the conductors 93', 94', 95' and those parallel thereto. Electromagnets, as is well known, may be substituted for the deflection plates to position the beam. Said conductors 90', 91', 92', and those parallel thereto are connected to switch points 161 of S*z*' which may be any suitable switch, such as the meter switch 70, rotary switch 164, or the tape-controlled switch means 162. Each of said mentioned conductors positioned in one "*z*" plane are electrically connected together to one switch point; each of the conductors in an adjacent z-plane are electrically connected together to an adjacent switch point, and so on. The arm 148 of the switch S*z*' is connected to the positive terminal of the electrical source 163 used to energize the tube 141.

In operation, the controls 149 and 150 are set to produce a suitable electron beam. When the beam strikes one of the ends of the conductors in wall 142, a voltage will exist between that conductor and all the conductors in the z-plane connected to a switch point which is contacted by the arm 148. This voltage will then cause a light-producing discharge between the beam-struck conductor and the conductor nearest to it in the z-plane at the region where the two wires cross. The intensity of the light may be controlled by adjusting the beam current by varying the bias on the tube by means of the control 149. Changing the potentials across the deflection plates *x* and *y*, and shifting the action to successive z-planes by shifting the arm 148, will cause the light-producing discharge to shift to other adjacently crossing wires. The result, is the production of a visual representation in three dimensions, of the characteristics of three variables.

To provide efficient operation of the cathode-ray switching tube, the physical connection between the wall 142 and the envelope of said tube 141, is made gas-tight. Also where the conductors pass through said wall, they shall be set in gas-tight. These are the conductors which terminate and become part of said wall's surface which faces the electron gun of said cathode-ray tube.

This invention is capable of various forms and numerous applications without departing from the essential feature herein disclosed. It is therefore intended and desired that the embodiments shown herein be deemed illustrative and not restrictive and that the patent shall cover all patentable novelty herein set forth; reference being had to the following claims rather than to the specific description herein to indicate the scope of this invention.

I claim:

1. An apparatus to produce visual three-dimensional representations within a given volume which is divided into zones whose respective positions therein are definable in a single mathematical system of three coordinates determining such volume and such apparatus operating to provide successive illumination in one zone at a time, comprising a plurality of electrically-operable illuminating means positioned one in each such zone, three electrical switching means, a circuit including said illuminating means, switching means, a source of electrical energy suitable for operating the said illuminating means and electrically conductive path means in electrical connection with said illuminating means, affording each of the switching means the selection of an illuminating means in any zone with respect to one of said coordinates respectively for operation, so that only the illuminating means having the coordinates selected by all three switching means simultaneously, is connected to the electrical energy source and operated thereby and three means, each operating one of the switch means respectively to determine the electrically conductive means to the illuminating means which is to be chosen for operation; at least that part of the electrically conductive means which is within said volume, being in the nature of wires.

2. The apparatus as defined in claim 1, wherein a part of at least one of the switching means includes an electron stream and means to direct said stream.

3. The apparatus as defined in claim 1, wherein one of the coordinates determines groups of zones and each illuminating means has two connections in the circuit; one of the switching means being electrically connected in the circuit to select the group in which an illuminating means is to be operated and the remaining two switching means being electrically connected in the circuit to select all the illuminating means similarly positioned with respect to the other two coordinates in all the groups.

4. The apparatus as defined in claim 3, wherein a part of at least one of the switching means includes an electron stream and means to direct said stream.

5. The apparatus as defined in claim 3, wherein all the illuminating means collectively is comprised of two sets of conductors; the conductors of one set being positioned in intersecting spaced relation with the conductors of the other set whereby one conductor of each set is in one of the zones respectively and also in all those zones, two of whose coordinates are identical respectively to the corresponding coordinates of such one zone such conductor is in.

6. The apparatus as defined in claim 4, wherein a part of at least one of the switching means includes an electron stream and means to direct said stream.

7. The apparatus as defined in claim 4, including a gas tight envelope enclosing the mentioned volume and a gas filling such envelope; said gas having a predetermined electrical conductivity when subjected to an electrical discharge of predetermined intensity.

8. The apparatus as defined in claim 1, wherein each of the illuminating means has three connections in the circuit; each of the electrical switching means being electrically connected in the circuit to select one of said three connections respectively.

9. The apparatus as defined in claim 8, wherein all illuminating means collectively is comprised of three sets of conductors; the conductors of each set being positioned in intersecting spaced relation with the conductors of the other sets whereby one conductor of each set is in one of the zones respectively and each conductor of all the sets is in all those zones, two of whose corresponding coordinates are identical respectively to the corresponding coordinates of such one zone such conductor is in.

10. The apparatus as defined in claim 9, wherein a part of at least one of the switching means includes an electron stream and means to direct said stream.

11. The apparatus as defined in claim 9, including a gas-tight envelope enclosing the mentioned volume and a gas filling such envelope; said gas having a predetermined electrical conductivity when subjected to an electrical discharge of predetermined intensity.

12. The apparatus as defined in claim 1, wherein the illuminating means are chosen for operation in rapid succession.

13. The apparatus as defined in claim 1, wherein each of the illuminating means is adapted to emit substantially omni-directional light when operated.

14. In an apparatus to produce visual three-dimensional representations, a source of electrical power, light-producing elements regularly spaced in a volume and exposed to view, each adapted to emit a light when actuated, means for conveying said electrical power to each light producing element to actuate same, means for applying said electrical power to only one of the light-producing elements at one time and means for shifting the application of said power to any other light-producing element; at least that part of the electrically conductive means which is within said volume, being in the nature of wires.

15. The apparatus as defined in claim 11, wherein the illuminating elements are chosen for operation in rapid succession.

16. The apparatus as defined in claim 11, wherein each of the illuminating elements is adapted to emit substantially omni-directional light when operated.

17. In combination, two sets of wires; each set comprising a multiplicity of regularly spaced wires positioned in a multiplicity of regularly spaced planes; all wires being in spaced relation and the wires of each set being in intersecting relation with the wires of the other set; one end of all the wires of at least one of the sets being substantially in a single plane, means issuing an electron stream against such plane, means to direct said stream, a gas-tight envelope enclosing the volume determined by all the wires and a gas filling such envelope; said gas having a predetermined electrical conductivity when subjected to an electrical discharge of predetermined intensity.

18. In combination, three sets of wires; each set comprising a multiplicity of regularly spaced wires positioned in a multiplicity of regularly spaced planes; all wires being in spaced relation and the wires of each set being in intersecting relation with the wires of the other sets; the plane of at least one of said sets of wires being in intersecting relation with the planes of the other sets; one end of all the wires of at least one of the sets being substantially in a single plane, means issuing an electron stream against such plane, menas to direct said stream, a gas-tight envelope enclosing the volume determined by all the wires and a gas filling such envelope; said gas having a predetermined electrical conductivity when subjected to an electrical discharge of predetermined intensity.

References Cited in the file of this patent

UNITED STATES PATENTS

| | | |
|---|---|---|
| 1,331,151 | Hopkins | Feb. 17, 1920 |
| 1,754,491 | Wald | Apr. 15, 1930 |
| 1,779,748 | Nicolson | Oct. 28, 1930 |
| 2,021,010 | Jenkins | Nov. 12, 1935 |
| 2,122,102 | Lundell | June 28, 1938 |
| 2,182,152 | Hullegand | Dec. 5, 1939 |
| 2,458,030 | Rea | Jan. 4, 1949 |
| 2,461,515 | Bronwell | Feb. 15, 1949 |
| 2,468,045 | Delonaine | Apr. 26, 1949 |
| 2,519,172 | Brown | Aug. 15, 1950 |
| 2,543,793 | Marks | Mar. 6, 1951 |
| 2,598,677 | Depp | June 3, 1952 |
| 2,602,921 | Peters | July 8, 1952 |
| 2,604,607 | Howell | July 22, 1952 |

FOREIGN PATENTS

| | | |
|---|---|---|
| 267,556 | Great Britain | May 3, 1928 |